United States Patent [19]

Aprille, Jr. et al.

[11] Patent Number: 4,606,043
[45] Date of Patent: Aug. 12, 1986

[54] PROGRAMMABLE AUTOMATIC CABLE EQUALIZER

[75] Inventors: Thomas J. Aprille, Jr.; Yen-long Kuo, both of Andover, Mass.; Charles F. Walker, Derry, N.H.

[73] Assignee: AT&T Bell Laboratories, Murray Hill, N.J.

[21] Appl. No.: 658,773

[22] Filed: Oct. 9, 1984

[51] Int. Cl.$^4$ .............................................. H04B 3/14
[52] U.S. Cl. .................................. 375/12; 178/69 R; 333/18
[58] Field of Search ...................... 375/12, 14; 333/18, 333/23, 28 R; 178/63 R, 63 C, 63 E, 69 R, 69 M; 330/278, 280, 281; 328/162, 166, 167; 179/16 F, 175.3 R; 364/825

[56] References Cited

U.S. PATENT DOCUMENTS

| | | | |
|---|---|---|---|
| 3,568,100 | 3/1971 | Tarbox | 333/18 |
| 3,652,952 | 3/1972 | Chen | 333/23 X |
| 3,824,501 | 7/1974 | Harris | 333/18 |
| 3,857,048 | 12/1974 | Meux et al. | 333/18 |
| 4,063,183 | 12/1977 | Evans | 333/18 |
| 4,525,684 | 6/1985 | Majefski | 333/28 R |

OTHER PUBLICATIONS

"New Line Driver and Line Receiver for DDS Local Distribution", Technical Memorandum, Oct. 12, 1978, W. D. Farmer.

Primary Examiner—Benedict V. Safourek
Attorney, Agent, or Firm—Volker R. Ulbrich

[57] ABSTRACT

The circuit (10) has a gain section which includes a first AGC circuit (12). The output of the gain section goes to a signal shaping section which includes a biquadratic filter (24), a summer (45), and a second AGC circuit (40). The two AGC circuits (12,40) are controlled by respective separate peak detectors (20, 50) and are noninteracting. For "short" cables, only the first AGC circuit (12) is active. For "long" cables, the first AGC circuit (12) is set at its gain breakpoint and the second AGC circuit (40) alone has active control. The shaping section includes a biquadratic filter (24) which is a tandem arrangement of a low-pass filter (26), an inverter (28), and an integrator (32). The low pass output (35) of the integrator (32) is connected to the noninverting (+) input of the a summing amplifier (45). The input (42) of the second AGC circuit (40) is connected to the band pass output (33) of the inverter (28), while its output (44) is connected to the inverting input (−) of the summing amplifier (45). The input of the second peak detector (50) is connected to the output (48) of the summing amplifier (45) and its output is connected to the control node (52) of the second AGC circuit (40). Operational amplifiers (G1,G2,G3,G4) of the first peak detector (20), the low-pass filter (26), the integrator (32), and the summing amplifier (45) are designed to be programmable by means of decoders (22, 36, 38, 46) to permit the equalizer (10) to accommodate different data rates.

4 Claims, 1 Drawing Figure

PROGRAMMABLE AUTOMATIC CABLE EQUALIZER

TECHNICAL FIELD

The invention relates to electronic equalizers for telecommunications cables which are designed to carry data signals.

BACKGROUND OF THE INVENTION

Data signals which are transmitted by cable from one data transmission unit to another suffer degradations in the form of a general attenuation of the signal voltage level and a distortion of the pulse shape, both of which are functions of the cable parameters and the data rate. These effects are generally compensated for at the receiving unit by a cable equalizer.

Voltage level can be restored by means of an automatic gain control (AGC) circuit, which typically makes use of a single junction field-effect transistor (JFET) for gain control. At a data rate of 4.8 kb/s (kilobits per second), cables with only 0-14 db (decibel) insertion loss, generally known as "short" cables, require only gain for restoration, since the shape distortion is not severe enough to be significant. Cables with a 15-31 db insertion loss, generally known as "long" cables, require both gain and shape restoration. The shape restoration involves a gain component relative to the spreading of the received pulse shape and typically requires the use of another AGC circuit with a JFET. It might appear to be feasible to have one kind of equalizer providing only gain for short cables and another kind of equalizer with both gain and shape restoration for long cables. However, as a practical matter, even for applications in which an equalizer is permanently connected to a single cable, it is advantageous to minimize the variety of equipment needed by the installer by supplying a single equalizer which can be manually switched as appropriate for the cable length or which is designed to automatically adjust for it. Additionally, in many other applications the equalizer is part of a data unit which may at a given time be receiving signals from a plurality of different cables and therefore must be capable of rapidly automatically adjusting accordingly within a range of about 31 db (decibels).

The useful range of a JFET device of the type generally used as the variable resistance control element for the AGC circuits in equalizers is about 25 db. In order to obtain the desired 31 db gain restoration range, there may be provided a pair of AGC circuits in a closely interactive configuration. Such arrangements are described, for example, in U.S. Pat. No. 3,824,501 issued July 16, 1974 to C. A. Harris and in U.S. Pat. No. 3,652,952, issued Mar. 28, 1972 to W. Chen, both of which are assigned to the same assignee as is the present invention. One drawback of such a closely interactive arrangement, however, is that the operating characteristics of the two JFET devices of the AGC circuits must be very closely matched in order to obtain the desired total gain range. This requirement reduces the reliability of the equalizer and significantly adds to its cost.

SUMMARY OF THE INVENTION

The novel automatic equalizer in accordance with the present invention is configured with two substantially non-interacting AGC circuits. A gain section with a first AGC circuit precedes a shaping section and operates alone for signal degradations of the magnitudes associated with short cables. For long cables, the first AGC circuit has its gain fixed at a predetermined breakpoint value of its gain characteristic and a second AGC circuit of the shaping section becomes active for gain control. Each of the AGC circuits has a separate peak detector unit associated with it. Because with this arrangement only one of the AGC circuits is in a control mode at any given time, their operation is virtually independent. This improves the reliability of the equalizer, reduces its cost, and extends the equalization range of 31 db to 35 db and greater. It is a further advantage of this equalizer that it contains programmable operational amplifiers which permit it to be readily programmed for different data rates.

BRIEF DESCRIPTION OF THE DRAWING

The drawing is a schematic functional block diagram of an automatic cable equalizer in accordance with one embodiment of the invention.

DETAILED DESCRIPTION

Figure 1:
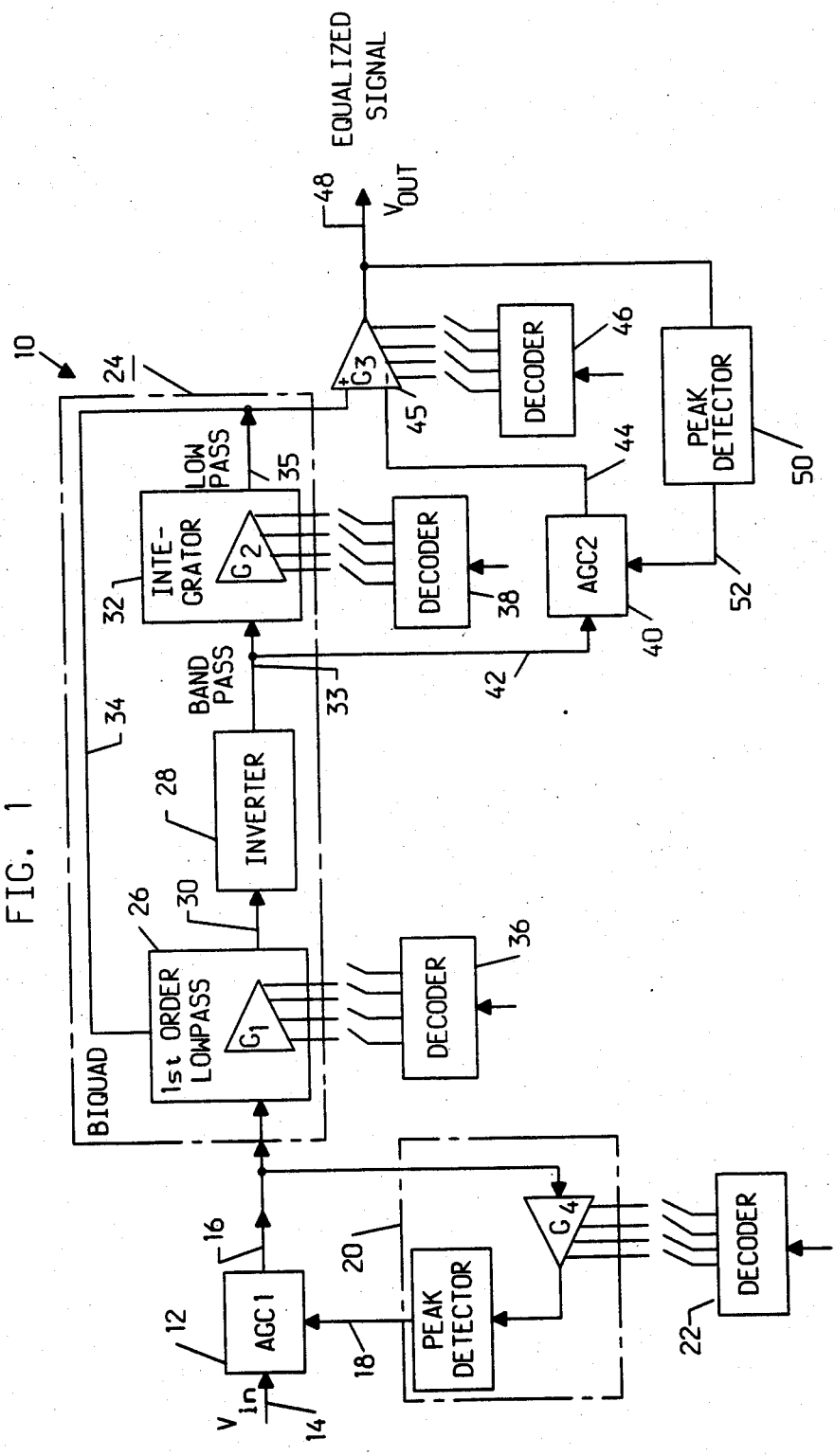

The automatic equalizer 10 shown in the drawing, which is one embodiment of the present invention, includes a first AGC circuit 12 with an input node 14 for receiving an input signal $V_{in}$, and output node 16, and a control node 18. A peak detector unit 20 is connected to detect the peak signals at the output node 16 and to generate therefrom a control voltage $V_c$ for the control node 18. The peak detector unit 20 includes an operational amplifier G4 with a programmable gain which can be set by means of a decoder 22.

The output node 16 of the first AGC circuit 12 is the input node of a biquadratic filter circuit, or BIQUAD 24 which includes a first order low pass filter 26 having its input connected to the node 16, an inverter 28 connected to an output node 30 of the filter 26, and an integrator 32 connected to the output 33 of the inverter 28. A feedback path 34 is provided between an output node 35 of the integrator 32 and the filter 26. Both the low pass filter 26 and the integrator 32 are configured with programmable operational amplifiers G1 and G2, respectively. Decoders 36 and 38 are associated with the amplifiers G1 and G2, respectively, for programming their gain.

A second AGC circuit 40, which is associated with the BIQUAD 24 for providing the amplitude component of the shape restoration, has its input node 42 tied to the output node 33 of the inverter 28, which is the band pass output of the BIQUAD 24. The output node 44 of the second AGC circuit 40 is connected to the inverting (−) input node of a programmable summing amplifier 45, which may be programmed by a decoder 46 associated with it. The noninverting (+) input node of the summing amplifier 45 is connected to the low pass output node of the BIQUAD 24, which is the output node 35 of the integrator 32. This forms a real zero in the transfer function for the voltage level correction of the signal shape distortion.

The configuration of the shaping section, which is made up of the BIQUAD 24, the summing amplifier 45, the second AGC circuit 40, and a second peak detector unit 50, is such that the amplitude and phase distortion components of the shape are simultaneously corrected. The function of a BIQUAD, together with an AGC circuit and a summing amplifier, in realizing a real zero for correcting shape distortion is well understood by those skilled in the art and is discussed, for example, in U.S. Pat. No. 3,568,100 issued Mar. 2, 1971 to R. A. Tarbox and having the same assignee as the present invention. The output node 48 of the summing amplifier G3 provides the output signal $V_{out}$ of the equalizer 10. The second peak detector unit 50 has its input node connected to the output node 48 and its output node connected to the control voltage node 52 of the second AGC circuit 40.

The BIQUAD 24 may be of a well known type and is therefore not described in terms of the particular configuration of circuit components. Likewise, the AGC circuits 12 and 40; their respective peak detector units 20 and 50; the amplifiers G1, G2, G3, and G4; and the decoders 22, 36, 38, 46 and their manner of affecting programming are well known to those skilled in the art. The decoders 22, 36, 38, and 46 may also be combined into one, shared decoder.

The first AGC circuit 12 operates for a loop loss less than 16 db, 14 db, 12 db and 10 db for 2.4, 4.8, 9.6, and 56 kb/s (kilobits per second), respectively, depending upon the desired data rate for which the amplifiers G1, G2, G3, and G4 have been programmed. For this range, the second AGC circuit 40 is turned off. When the loop loss is greater than the above values, the gain of the first AGC 12 is set at a specified value, preferably at the breakpoint of its gain characteristic, and the second AGC circuit 40 is turned on. The second AGC circuit 40, in combination with the BIQUAD 24, then performs the automatic equalizing within a range of approximately 25 db. Because the two AGC circuits 12, 40 are controlled by the two independent peak detector units 20 and 50, the total equalization range of the equalizer can be extended to 35 db and higher. Such an extended range is particularly advantageous in that it permits the transmission of a somewhat higher data rate than that for which the cable is designed, thus making possible the accommodation of a secondary channel.

What is claimed is:

1. An automatic cable equalizer, comprising:
    a first automatic gain control means having an input node, an output node, and a control node;
    a first peak detector means having an input node connected to the output node of the first gain control means and having an output node connected to the control node of the first gain control means;
    a biquadratic filter means having an input node, a band pass node, and a low pass node, the input node being connected to the output node of the first gain control means;
    a second automatic gain control means having an input node, an output node, and a control node, the input node being connected to the band pass node of the biquadratic filter means;
    a summing means including an inverting input node, a noninverting input node, and an output node, the noninverting input node being connected to the low pass node of the biquadratic filter means and the inverting input node being connected to the output node of the second gain control means, and
    a second peak detector means having an input node connected to the output node of the summing means and having an output node connected to the control node of the second gain control means.

2. The equalizer defined in claim 1 wherein the biquadratic filter means comprises a first order low pass filter, an inverter, and an integrator respectively connected in tandem, the band pass node being the input node of the integrator and the low pass node being the output node of the integrator.

3. The equalizer defined in claim 2 comprising means for programmably setting the operating characteristics of the low pass filter, the integrator, the first peak detector, and the summing means.

4. The equalizer defined in claim 3 wherein the setting means comprises at least one programmable operational amplifier and a decoder associated therewith.

* * * * *